United States Patent
Arimilli et al.

(10) Patent No.: US 6,477,637 B1
(45) Date of Patent: Nov. 5, 2002

(54) METHOD AND APPARATUS FOR TRANSPORTING STORE REQUESTS BETWEEN FUNCTIONAL UNITS WITHIN A PROCESSOR

(75) Inventors: Ravi Kumar Arimilli; Robert Alan Cargnoni; Guy Lynn Guthrie, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/409,802

(22) Filed: Sep. 30, 1999

(51) Int. Cl.[7] ............................................. G06F 3/00
(52) U.S. Cl. .................................... 712/218; 710/61
(58) Field of Search ........................... 712/218, 19, 6; 710/61, 52, 39, 36

(56) References Cited

U.S. PATENT DOCUMENTS

| | | | | |
|---|---|---|---|---|
| 5,404,550 A | * | 4/1995 | Horst | 712/14 |
| 5,574,933 A | * | 11/1996 | Horst | 710/30 |
| 5,659,780 A | * | 8/1997 | Wu | 708/315 |
| 5,758,139 A | * | 5/1998 | Sutherland et al. | 710/29 |
| 5,799,134 A | * | 8/1998 | Chiueh et al. | 706/26 |
| 5,819,308 A | * | 10/1998 | Tien et al. | 711/108 |
| 5,937,177 A | * | 8/1999 | Molnar et al. | 712/18 |
| 6,298,423 B1 | * | 10/2001 | Johnson et al. | 711/131 |

\* cited by examiner

*Primary Examiner*—Eric Coleman
(74) *Attorney, Agent, or Firm*—Casimer K. Salys; Bracewell & Patterson, L.L.P.

(57) ABSTRACT

A method and apparatus for transporting store requests between functional units within a processor is disclosed. A data processing system includes a data dispatching unit, a data receiving unit, a segmented data pipeline coupled between the data dispatching unit and the data receiving unit, and a segmented feedback line coupled between the data dispatching unit and the data receiving unit. Having multiple latches interconnected between segments, the segmented data pipeline systolically transfers data from the data dispatching unit to the data receiving unit. The segmented feedback line has multiple control latches interconnected between segments. Each of the control latches sends a control signal to a respective one of the latches in the segmented instruction pipeline to forward data to a next segment within the segmented data pipeline.

8 Claims, 3 Drawing Sheets

US 6,477,637 B1

METHOD AND APPARATUS FOR TRANSPORTING STORE REQUESTS BETWEEN FUNCTIONAL UNITS WITHIN A PROCESSOR

RELATED PATENT APPLICATION

The present patent application is related to copending application U.S. Ser. No. 09/409,801, filed on even date, entitled "METHOD AND APPARATUS FOR DISPATCHING MULTIPLE STORE REQUESTS BETWEEN FUNCTIONAL UNITS WITHIN A PROCESSOR"

BACKGROUND OF THE INVENTION

1. Technical Field

The present invention relates to a method and apparatus for data processing in general, and in particular to a method and apparatus for transporting access requests within a data processing system. Still more particularly, the present invention relates to a method and apparatus for queuing and transporting store requests between functional units within a processor.

2. Description of the Prior Art

Designers of modern state-of-the-art processors are continually attempting to enhance performance aspects of such processors. One technique for enhancing data processing efficiency is the achievement of shorter cycle times and a lower cycles-per-instruction ratio by issuing multiple instructions concurrently. In conjunction, separate execution units that can operate concurrently may be utilized to execute issued instructions. For example, some superscalar processors employ pipelined branch, fixed-point, and floating-point executions units to execute multiple instructions concurrently. As a result of the concurrent issuance and execution of multiple instructions, instruction execution performance is increased.

In addition, processor designers are faced with the challenge of constructing efficient means for sending pipeline commands, request or instructions, between various functional units within a processor. Because multiple cycles are required to transport a command between two functional units within a large processor, it is important that the transport protocol can maximize the rate at which commands can be sent, even with added transport latency that may exist between the two functional units. This is because even with multiple execution units, the performance of a processor still depends upon the rate at which instructions, commands, and requests can be transported between functional units. Thus, it should be apparent that a need exists for an improved method and apparatus for transporting instructions, commands, or requests between functional units within a processor such that transport delay among functional units is minimized.

SUMMARY OF THE INVENTION

In accordance with a preferred embodiment of the present invention, a data processing system includes a data dispatching unit, a data receiving unit, and a segmented data pipeline along with a segmented feedback line coupled between the data dispatching unit and the data receiving unit. Having multiple latches interconnected between segments, the segmented data pipeline systolically transfers data from the data dispatching unit to the data receiving unit. The segmented feedback line has multiple control latches interconnected between segments. Each of the control latches sends a control signal to a respective one of the latches in the segmented instruction pipeline to forward data to a next segment within the segmented data pipeline.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
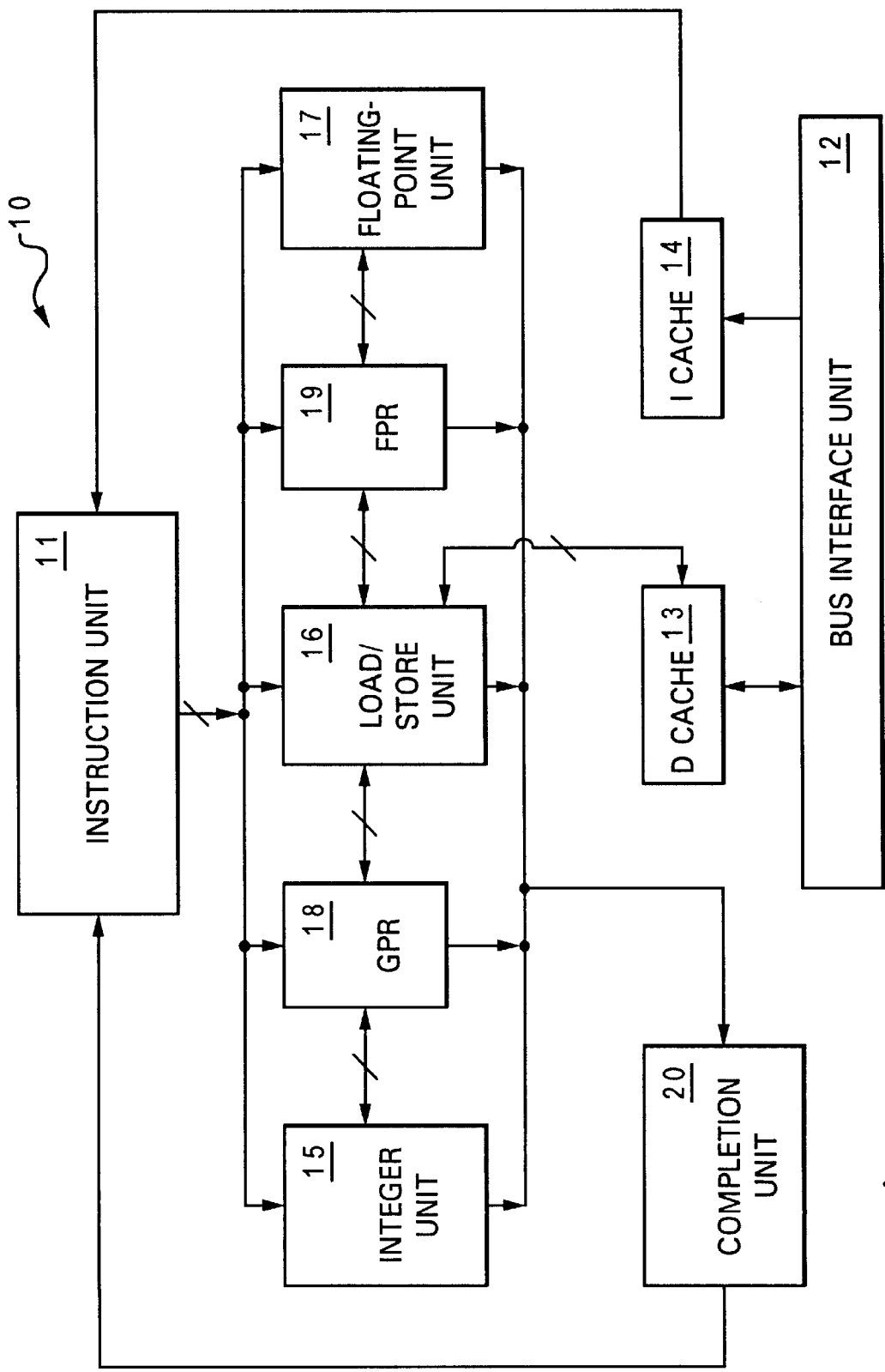
FIG. 1 is a block diagram of a processor in which a preferred embodiment of the present invention is implemented.

Referring now to the drawings and in particular to FIG. 1, there is depicted a block diagram of a processor 10 in which a preferred embodiment of the present invention is implemented. Within processor 10, a bus interface unit 12 is coupled to a data cache 13 and an instruction cache 14. Instruction cache 14 is further coupled to an instruction unit 11 that fetches instructions from instruction cache 14 during each execution cycle.

Processor 10 also includes at least three execution units, namely, an integer unit 15, a load/store unit 16, and a floating-point unit 17. Each of execution units 15–17 can execute one or more classes of instructions, and all execution units 15–17 can operate concurrently during each processor cycle. After execution of an instruction has terminated, the associated one of execution units 15–17 stores data results to a respective rename buffer (not shown), depending upon the instruction type. Then, any one of execution units 15–17 may signal a completion unit 20 that the execution of an instruction has finished. Finally, each instruction is completed in program order, and the result data are transferred from a respective rename buffer to a general purpose register 18 or a floating-point register 19, accordingly.

Figure 2:
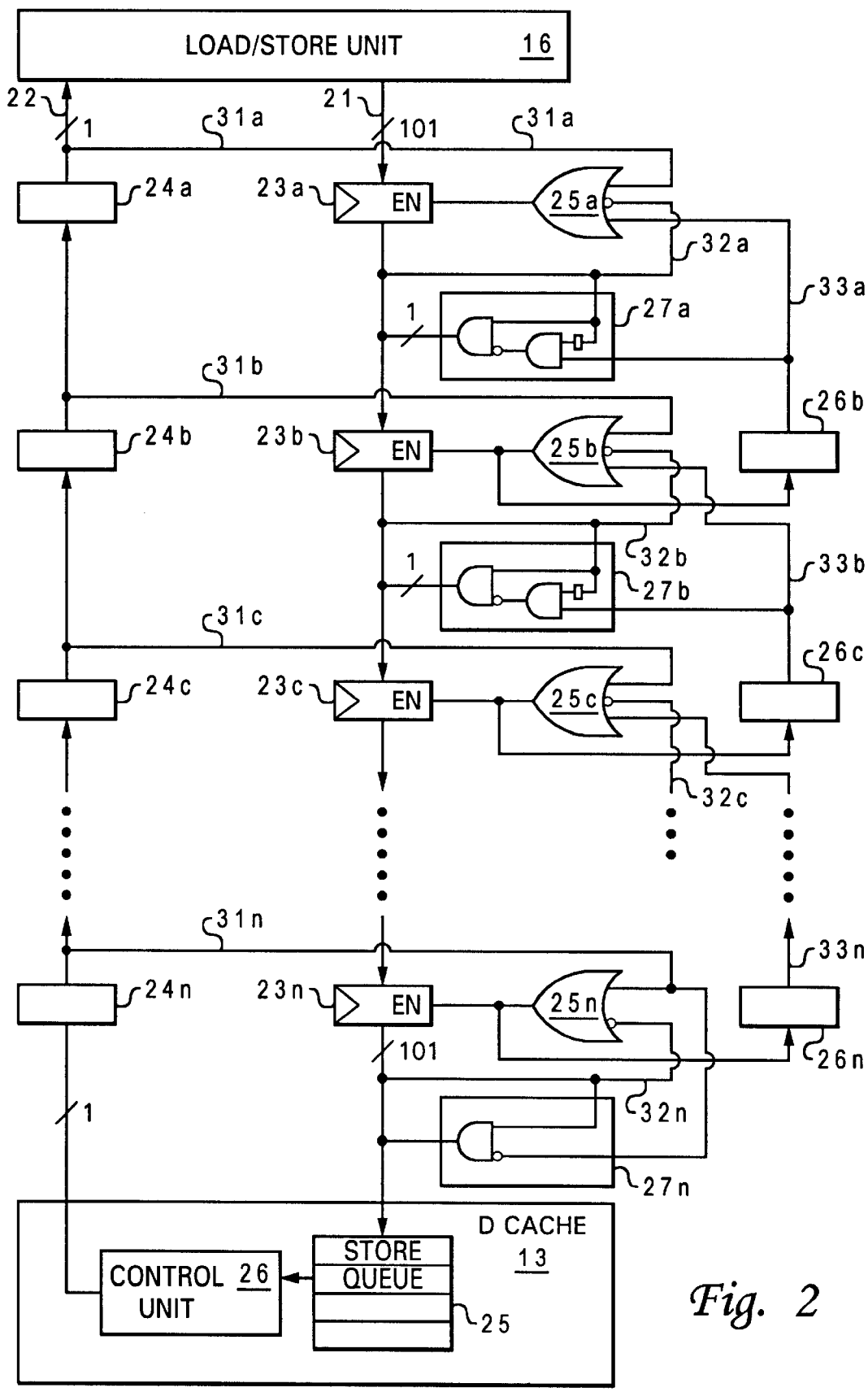
FIG. 2 is a detailed block diagram of a high-speed request pipeline connected between the load/store unit and the data cache from FIG. 1, in accordance with a preferred embodiment of the present invention.

With reference now to FIG. 2, there is depicted a detailed block diagram of a high-speed request pipeline, in accordance with a preferred embodiment of the present invention. As shown, a request pipeline 21 is connected between, for example, load/store unit 16 and data cache 13 from FIG. 1. Executed but uncompleted store requests can be transported between load/store unit 16 and data cache 13 via request pipeline 21. Request pipeline 21 has multiple segments, which are interconnected by latches 23a–24n. Latches 23a–23n are needed to maintain the required cycle time to transport store requests between load/store unit 16 and data cache 13. In one embodiment, each store request has 101 bits, preferably in form of one request_valid bit, 32 address bits, four command bits, and 64 data bits. Store request can be gathered in a store queue 25 upon reaching data cache 13.

In addition to request pipeline 21, a feedback line 22 is also connected between load/store unit 16 and data cache 13. Feedback line 22 informs load/store unit 16 when data cache 13 has removed an entry from request pipeline 21. Load/store unit 16 maintains a numerical count of store requests currently loaded in request pipeline 21. With the numerical count, load/store unit 16 is able to detect whether request pipeline 21 is full (the maximum count of store requests that request pipeline 21 can hold is equal to the number of latches 23a–23n plus the number of entries in store queue 25). For example, after a store request has been removed out of store queue 25, a feedback signal is sent to load/store unit 16 via feedback line 22 to inform load/store unit 16 that the total number of store requests in request pipeline 21 has been reduced by one and that a new store request can be sent via request pipeline 21. Similar to request pipeline 21, feedback line 22 also has multiple segments, which are interconnected by control latches 24a–24n. The feedback signal preferably travels from between data cache 13 and load/store unit 16 within the same cycle time as store requests.

In accordance with a preferred embodiment of the present invention, each of control latches 24a–24n within feedback line 22 is associated with a respective one of latches 23a–23n within request pipeline 21. As shown in FIG. 2, control latch 24a is connected to latch 23a via an OR gate 25a, control latch 24b is connected to latch 23b via an OR gate 25b, etc. Furthermore, each of latches 23a–23n is associated with a preceding one the latches. For example, latch 23b is connected with latch 23a via a latch 26a and OR gate 25a, latch 23c is connected with latch 23b via a latch 26b and OR gate 25b, etc. At the final latch stage, data cache 13 is connected with latch 23n.

With the above-mentioned associations, store requests can be propagated down request pipeline 21 by three separate ways, namely, by the prompting of a feedback signal from each of control latches 24a–24n, by the prompting of a return signal from each of latches 23a–23n, and by the prompting of a return signal from a latch stage "below." Each of these is explained below in turn. First, store requests can be propagated down request pipeline 21 by the prompting of a feedback signal from each of control latches 24a–24n on feedback line 22. For example, control latch 24n sends a feedback signal to latch 23n via a feedback line 31n and OR gate 25n to move a store request from latch 23n to store queue 25, control latch 24b sends a feedback signal to latch 23b via a feedback line 31b and OR gate 25b to move a store request from latch 23b to latch 23c, etc.

During operation, when the feedback signal is transferred from control latch 24n to the next control latch, the feedback signal is also utilized to enable latch 23n to load data from a latch "above" since a store request in latch 24n has just been propagated to store queue 25. As the feedback signal is travelling "up" feedback line 22, a store request (if present) in each of latches 23a–23n is propagating "down" request pipeline 21, until the feedback signal reaches load/store unit 16.

Second, store requests can be propagated down request pipeline 21 by the prompting of a return signal from each of latches 23a–23n via a respective one of return lines 32a–32n. For example, latch 23a sends a return signal to latch 23a via a return line 32a and OR gate 25a to load a store request into latch 23a, latch 23b sends a return signal to latch 23b via a return line 32b and OR gate 25b to load a store request into latch 23b, etc. This propagation movement serves to fill in any empty latch (i.e., a latch that does not contain a valid request) within request pipeline 21. Preferably, the valid_request bit (i.e., bit 0 of the 101 bits) is used as the return signal on return lines 32a–32n to determine whether a latch within request pipeline 21 is empty.

Third, store requests can be propagated down request pipeline 21 by the prompting of a return signal from latches 26b–26n. Each of latches 26b–26n serve as an enable control for a latch preceding each of latches 23a–23n. For example, OR gate 25b sends a return signal to latch 23a via a latch 26b, a return line 33a, and OR gate 25a to cause a store request to be loaded into latch 23a from load/store unit 16, OR gate 25c sends a return signal to latch 23b via a latch 26c, a return line 33b, and OR gate 25b to cause a store request to be loaded into latch 23b from latch 23a, etc. The purpose of this return signal is to detect when a latch stage "below" has just latched a store request from a current latch stage. Because this indication had to be latched (i.e., latches 26b–26n are also required to key off OR gate 25b–25n), gates 27a–27n are utilized to prevent the same store request from loading twice. For example, gate 25b is active, latch 23b is being enabled such that in the next cycle, it will contain what was in latch 23a in the previous cycle. But because it takes a cycle (via latch 26b) for latch 23a to realize its request has already been loaded into latch 23b, it must gate off it request via gate 27a for one cycle to prevent the same request from being loaded twice by latch 23b.

Figure 3:
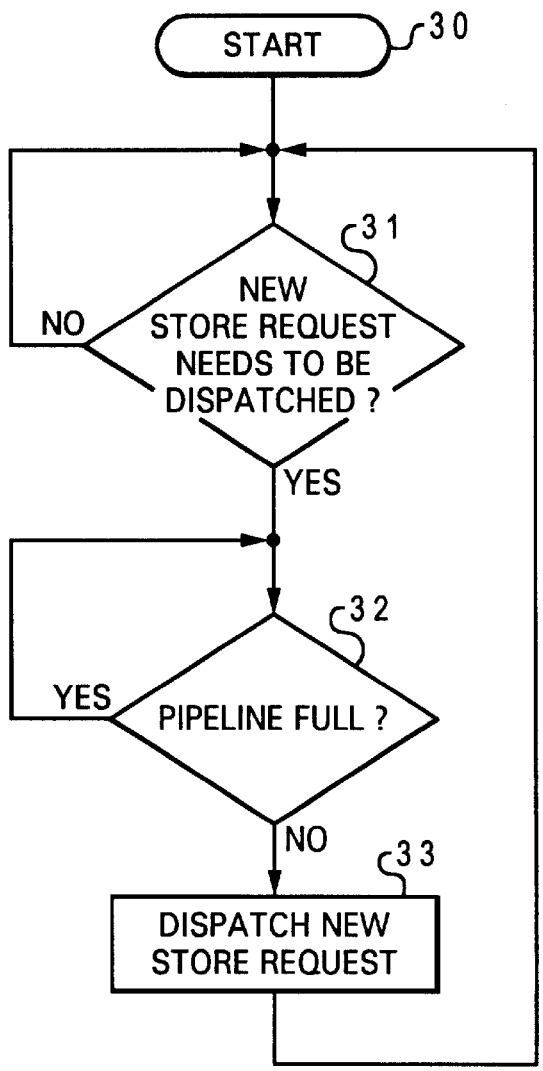
FIG. 3 is a high-level control flow diagram of the operation of the load/store unit from FIG. 2, in accordance with a preferred embodiment of the present invention.

Referring now to FIG. 3, there is depicted a high-level control flow diagram of the operation of load/store unit 16, in accordance with a preferred embodiment of the present invention. Starting at block 30, a determination is made whether or not a new store request needs to be dispatched (for example, when execution of a store instruction by load/store unit 16 is completed), as shown in block 31. If no new store request need to be dispatched, the process returns to block 31; otherwise, a determination is made whether or not request pipeline 21 (from FIG. 2) is full, as depicted in block 32. Load/store unit 16 maintains a counter to keep track of the number of store requests that have been dispatched down request pipeline 21. The counter is incremented every time a new store request is dispatched down request pipeline 21 until the maximum count (i.e., the number of latches within request pipeline 21 plus the number of latches within store queue 25) is reached. On the other hand, the counter is decremented when load/store unit 16 receives a feedback back signal from feedback line 22.

A new store request is dispatched to request pipeline 21 when request pipeline 21 is not full, as illustrated in block 33, and the process returns to block 31. Otherwise, load/store unit 16 waits until request pipeline 21 becomes available for data dispatching.

Figure 4:
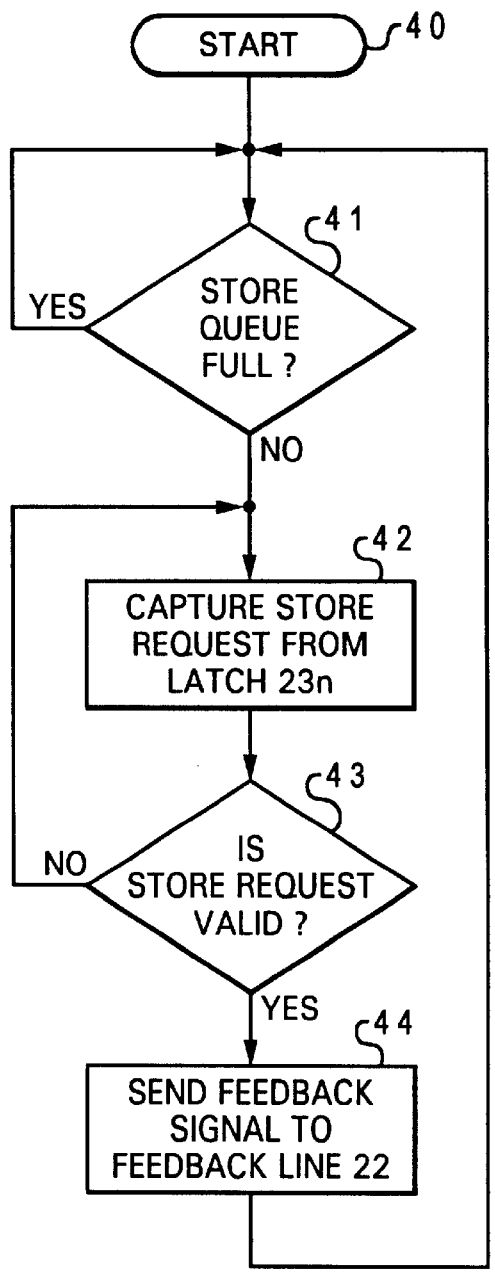
FIG. 4 is a high-level control flow diagram of the operation of the control unit within the data cache from FIG. 2, in accordance with a preferred embodiment of the present invention.

With reference now to FIG. 4, there is depicted a high-level control flow diagram of the operation of control unit 26 within data cache 13 (from FIG. 2), in accordance with a preferred embodiment of the present invention. Starting at block 40, a determination is made whether or not store queue 25 (from FIG. 5) is full, as shown in block 41. If store queue 25 is full, the process returns to block 41; otherwise, a store request is captured from latch 23n (from FIG. 2), as depicted in block 42. A determination is then made whether or not the captured store request is a valid request, as shown in block 43. If the captured store request is a valid request, then the captured data is placed within store queue 25, and a feedback signal is sent to feedback line 22, as depicted in block 44, indicating that a store request can be dispatched down data pipeline 21. Otherwise, if the captured store request is not a valid request, the process return to block 42.

As has been described, the present invention provides an improved method and apparatus for transporting requests within a processor that minimize transporting latency. Although an execution unit and a store queue are utilized to illustrate the present invention, it is understood by those skilled in the art that the illustrated principles can be applied to data transfer between any two function units within a data processing system.

While the invention has been particularly shown and described with reference to a preferred embodiment, it will be understood by those skilled in the art that various changes in form and detail may be made therein without departing from the spirit and scope of the invention.

What is claimed is:

1. A data processing system, comprising:

a data dispatching unit;

a data receiving unit;

a segmented data pipeline, coupled between said data dispatching unit and said data receiving unit, having a plurality of latches interconnected between segments, for systolically transferring data from said data dispatching unit to said data receiving unit; and a segmented feedback line, coupled between said data dispatching unit and said data receiving unit, having a plurality of control latches interconnected between segments, wherein each of said control latches sends a control signal to a respective one of said latches in said segmented data pipeline to forward data to a next segment within said segmented data pipeline.

2. The data processing system according to claim 1, wherein each of said latches within said segmented pipeline also sends a return signal to itself to forward data to a next segment within said segmented data pipeline.

3. The data processing system according to claim 1, wherein each of said latches within said segmented pipeline also receives a return signal from a preceding one of said latches in said segmented instruction pipeline to forward data to a next segment within said segmented data pipeline.

4. The data processing system according to claim 1, wherein said data dispatching unit is a load/store unit and said data receiving unit is a store queue.

5. A method for dispatching instructions between a data dispatching unit and a data receiving unit within a data processing system, said method comprising the steps of:

connecting said data dispatching unit and said data receiving unit with a segmented data pipeline for systolically transferring data from said data dispatching unit to said data receiving unit, wherein said segmented data pipeline has a plurality of latches interconnected between segments; and connecting said data dispatching unit and said data receiving unit with a segmented feedback line, wherein said segmented feedback line has a plurality of control latches interconnected between segments, wherein each of said control latches sends a control signal to a respective one of said latches in said segmented data pipeline to forward data to a next segment within said segmented data pipeline.

6. The method according to claim 5, wherein said method further includes a step of sending a return signal from each of said latches within said segmented pipeline to itself to forward data to a next segment within said segmented data pipeline.

7. The method according to claim 5, wherein said method further includes a step of receiving a return signal from a preceding one of said latches in said segmented instruction pipeline by each of said latches within said segmented pipeline to forward data to a next segment within said segmented data pipeline.

8. The method according to claim 5, wherein said data dispatching unit is a load/store unit and said data receiving unit is a store queue.

* * * * *